3,105,671
REACTION CONTROLLER
Bernard R. Teitelbaum, Royal Oak, Raymond D. Ei, Berkley, and Albert Blatter, Clawson, Mich., assignors to The Bendix Corporation, a corporation of Delaware
Filed Aug. 5, 1959, Ser. No. 831,796
1 Claim. (Cl. 251—30)

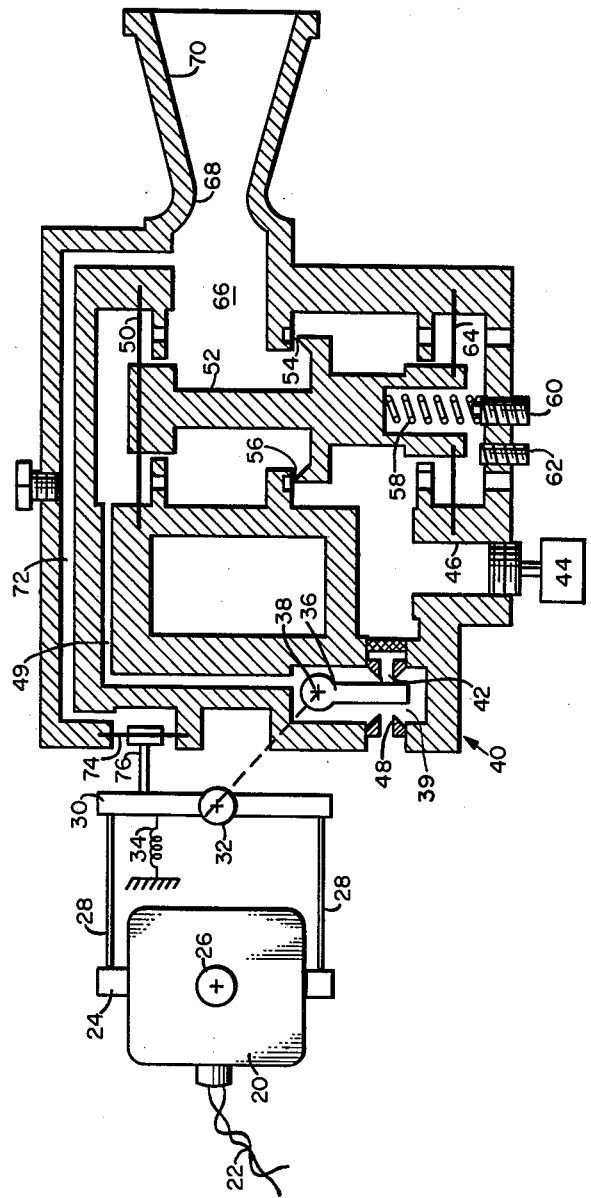

This invention pertains to a reaction controller wherein an input signal, such as a small electrical signal, is used to correspondingly control a fluid output. More particularly, this invention pertains to a controller having special use as a guidance member in a space vehicle.

It is an object of this invention to provide a reaction controller wherein there is no wastage of power under quiescent conditions.

It is another object of this invention to provide in such a controller a pilot valve for establishing a pilot pressure corresponding to an electrical input, with the pilot pressure controlling a power valve used for forming a variable connection between a fluid input and a fluid output, with means for making the pilot pressure very sensitive to changes in electrical signal change and with means to isolate the pilot valve from changes in pilot pressures.

It is a further object of this invention to provide a controller which is substantially insensitive to variations in the valve assemblies due to temperature differences, aging of the valving parts, and other transient and variable conditions by using a feedback from the controller output to the controller input.

It is an object of this invention to provide a reaction controller having a motor for receiving an electrical input, a pilot valve connected to the output of the motor and situated between two metering orifices which are subject to constant pressures having a pressure differential existing therebetween, a biasing member for holding the valve against the orifice of the greater pressure until the motor moves the valve from such orifice to establish a pilot pressure in the pilot area which varies according to valve movement from such orifice, and a power valve connecting a fluid input and output and means for gradually opening said power valve according to the variations in pilot pressure.

It is a still further object to provide such a system with a feedback passage from the fluid output to the control for the pilot valve, so that the system fluctuations which are present at the output can be applied in a reverse manner to the input for providing a continuing correction.

These and other objects will become more apparent when a preferred embodiment of this invention is described in connection with the drawing which shows a partially schematic view of a controller of this invention in section.

The controller of this invention is adapted to receive a small electrical input, such as is available from the controls of a space vehicle, and use this signal to accurately vary a relatively high volume of air ejected from a nozzle. A reaction force equal and opposite to the force of the escaping gas from the nozzle is produced. By properly varying the electrical signals to controllers arranged about a space vehicle, the inclination and direction of such a vehicle can be controlled. Each controller is provided with means for completely sealing the supply pressure during inactivity thereby reducing waste. Also, means are provided so that the fluid output is very closely proportional to the electrical input. The pilot valve, which is controlled by an electrical motor and which provides a variable pilot pressure to actuate a larger power valve, is very insensitive to changes in such pilot pressure. Also, a feedback is used between the output and the pilot valve control to automatically correct for system variations.

In the drawing is shown an electrical torque motor 20 which receives at its input 22 an electrical signal from a vehicle control section, not shown. The motor 20 controls the rotational position of an arm 24 pivoted at 26. Arm 24 is pivotally connected at each end to rods 28 which are also pivotally connected to a second arm 30 pivoted at its center point 32. A spring 34 biases arm 30 in a counter clockwise direction.

Mechanically linked to arm 30 and rotatable therewith is a flutter or pilot valve 36 which is pivoted at one end 38 in a chamber 39 of housing 40 in which there are a series of passages and valve mountings which control passage of fluid between an input and output. Closely adjacent the free end of valve 36 is an orifice 42 against which valve 36 is biased to provide a complete closing of the orifice. The orifice 42 is subject to a pressure from source 44 which is connected to inlet 46 of housing 40. Opposite orifice 42 and also registerable with valve 36 is a second orifice 48 which is connected to ambient pressure. The ratio between the diameter of an orifice to the spacing between the orifice and the side of valve 36 is large. For example, the diameter of each orifice may be .016" while the spacing between one orifice and a valve side may be .004", when the other valve side abuts the other orifice. Metering is provided by the close spacing between the valve sides and the orifices.

As motor 20 turns arm 24 in a clockwise direction, valve 36 is moved a small increment away from orifice 42 allowing supply pressure from source 44 to enter chamber 39. At the same time valve 36 moves closer to orifice 48, which is normally at a greatly reduced pressure (in outer space this pressure would be near zero). As the space between one valve side and orifice 42 increases to provide a pressure increase in chamber 39, the space between the opposite valve side and orifice 48 decreases to further increase the pressure in chamber 39 thereby making the chamber or pilot pressure very sensitive to valve movement.

Another feature of this invention resides in the fact that the movement of valve 36 is substantially independent of chamber 39 pressure. Since the pressures at orifices 42, 48 are substantially constant, the areas of valve 36 adjacent to orifices 42 and 48 are subject to substantially constant pressures independent of the pressure in chamber 39. Other areas of valve 36 are subject to chamber 39 pressure, but these pressures cancel each other since for an area subject to pressure in one direction, there is an equal area subject to pressure in the opposite direction. This makes valve 36 substantially insensitive to pressure variations in chamber 39 to increase system accuracy.

Subject to the pressure in chamber 39 is diaphragm 50 which is mounted at its outer periphery to housing 40 and has connected at its center a power valve 52 which is movable along a vertical axis subject to the chamber 39 pressure. Located intermediately of valve 52 is a circumferential rim 54 which registers with a valve seat 56 formed in housing 40. In the position shown, rim 54 forms a complete seal with seat 56 so that no fluid can pass thereacross from pressure source 44.

At the opposite end of valve 52 is a trim spring 58 which is adjustable through positioning of set screw 60. Located adjacent set screw 60 is an adjustable stop 62. Fastened to the outer portion of the valve 52 end is a diaphragm 64 which is supported at its outer periphery in housing 40. The upper surface of diaphragm 64 is subject to input pressure from source 44 and is of such an area that valve 52 may be moved downwardly at the desired pressure range available from chamber 39 acting on the upper face of diaphragm 50. Further adjustment for this pressure range may be made by turning set screw 60 to the appropriate position.

Formed in housing 40 is an upstream pressure chamber 66 which connects to throat 68 of a thrust nozzle 70 having outwardly flaring sides. Subject to the pressure in chamber 66 through passage 72 is diaphragm 74 which is mounted at its outer periphery in housing 40 and which has attached to the center thereof a link 76 which is pivotally connected to arm 30. Link 76 is positioned in such a manner that the pressure in chamber 66 will exert a force on link 76 which opposes the force developed by motor 20 for turning flapper valve 36 in a clockwise direction from its closed position. In this manner a bias is placed on flapper valve 36 which is proportional to the fluctuations of the controller system due to variations in materials caused by temperature differentials, aging of material parts and seals, and other existing conditions. If the output pressure in chamber 66 is too high due to a system variation, this will be subtracted from the input since valve 36 will have a lesser force tending to open it and this will tend to compensate for the high variation.

*Operation*

In the operation of this embodiment a signal is received at 22 by motor 20 and a corresponding torque is applied to arm 24 in a clockwise direction. This rotates arm 30 and valve 36 against the bias of spring 34 and link 76 to open valve 36 a corresponding degree from orifice 42 and move valve 36 a corresponding degree toward orifice 48. The greater the movement of valve 36 from orifice 42 and toward orifice 48, the greater the pressure developed in chamber 39. Due to orifice 48 being opposite orifice 42 and connected to a substantially constant ambient pressure, valve 36 is substantially independent of chamber 39 pressure variations.

The pressure increase in chamber 39 is felt at diaphragm 50 through passage 49 moving power valve 52 downwardly a corresponding amount. This will open the seal between rim 54 and seat 56 allowing a proportionate amount of pressure from source 44 to enter chamber 39 and pass through restriction 68 and nozzle 70. Once the fluid passes restriction 68 it will increase in speed due to the outwardly flared sides and reduced pressure of nozzle 70. This causes an opposite and equal reactive force tending to move the housing 40 in a leftwardly direction dependent upon the mass and velocity of air escaping from nozzle 70. The pressure in chamber 66 is felt on diaphragm 74 through passage 72 and this biases arm 30 through link 76 in a counter-clockwise direction. Therefore, the input from torque motor 20 must overcome this bias and any irregularities will be applied in a reverse manner to valve 36 thereby minimizing distortion and unwanted variations.

Although this invention has been disclosed and illustrated with reference to particular applications, the principles involved are susceptible of numerous other applications which will be apparent to persons skilled in the art. The invention is, therefore, to be limited only as indicated by the scope of the appended claim.

Having thus described our invention, we claim:

A valve member comprising a housing, a supply pressure inlet and an output pressure outlet being formed in said housing, main valve means being between and providing a seal between said inlet and outlet, a valve seat being formed in said housing, said valve means having intermediately thereof a radially extending flange engageable with said seat and having an effective sealing area, said valve being connected to said housing by diaphragm means on either side of said flange with said flange separating said inlet and outlet pressures, the effective areas of each of said diaphragm means being approximately equal to the effective sealing area of said valve so that the amount of and fluctuations in the inlet and outlet pressures acting on the diaphragms and valve tend to balance out, the outer sides of at least one of said diaphragms being subject to a control pressure for moving said valve, a chamber having closely spaced opposed orifices formed therein, flapper valve means being disposed between said orifices and movable from one orifice to the other, the diameter of each orifice being relatively large compared to the maximum distance possible between said flapper valve means and said orifice, one of said orifices being in communication with ambient pressure and the other of said orifices being in communication with a supply pressure source, positioning means to position said flapper valve means thereby controlling the pressure in said chamber, said chamber communicating with the outer side of said one diaphragm to control the position of said diaphragm and the valve means connected thereto, pressure responsive means operably connected to said positioning means, feedback passage means for establishing communication between said output outlet pressure and said pressure responsive means to cause said pressure responsive means to bias said positioning means in a direction opposing the movement of said positioning means.

References Cited in the file of this patent

UNITED STATES PATENTS

| | | |
|---|---|---|
| 1,153,681 | Fulton | Sept. 14, 1915 |
| 2,019,766 | Peterson | Nov. 5, 1935 |
| 2,185,671 | Kimball | Jan. 2, 1940 |
| 2,302,252 | Raymond et al. | Nov. 17, 1942 |
| 2,477,897 | Ray | Aug. 2, 1949 |
| 2,545,815 | Klinge | Mar. 20, 1951 |
| 2,573,522 | Watt | Oct. 30, 1951 |
| 2,672,151 | Newbold | Mar. 16, 1954 |
| 2,752,941 | Mitchell | July 3, 1956 |
| 2,754,843 | Hauber | July 17, 1956 |
| 2,826,215 | Wolfslau et al. | Mar. 11, 1958 |
| 2,851,048 | Hutchinson | Sept. 9, 1958 |
| 2,853,976 | Gerwig et al. | Sept. 30, 1958 |
| 2,879,781 | Gimson | Mar. 31, 1959 |
| 2,886,010 | Hayos et al. | May 12, 1959 |
| 2,958,503 | Vaughn | Nov. 1, 1960 |

FOREIGN PATENTS

| | | |
|---|---|---|
| 462,471 | Canada | of 1950 |